Oct. 30, 1928.  
E. ERICSSON  
ROTARY ENGINE  
Filed June 6, 1925  
1,689,523  
3 Sheets-Sheet 2
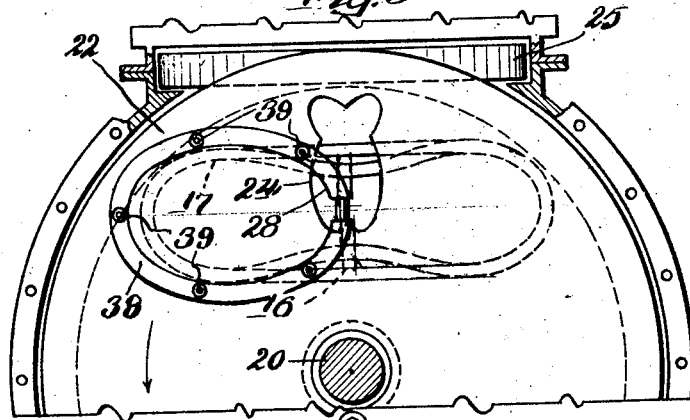
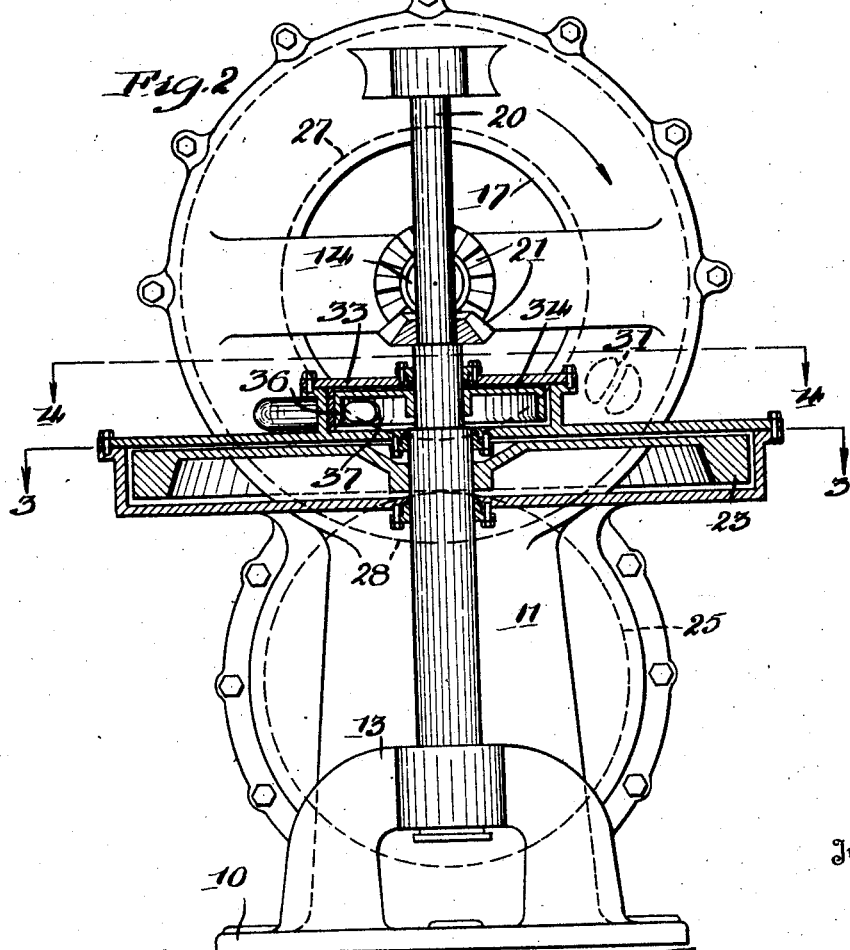
Inventor
F. Lou Ericsson  
By Stryker & Stryker  
Attorneys Oct. 30, 1928.
E. ERICSSON
1,689,523
ROTARY ENGINE
Filed June 6, 1925   3 Sheets-Sheet 3
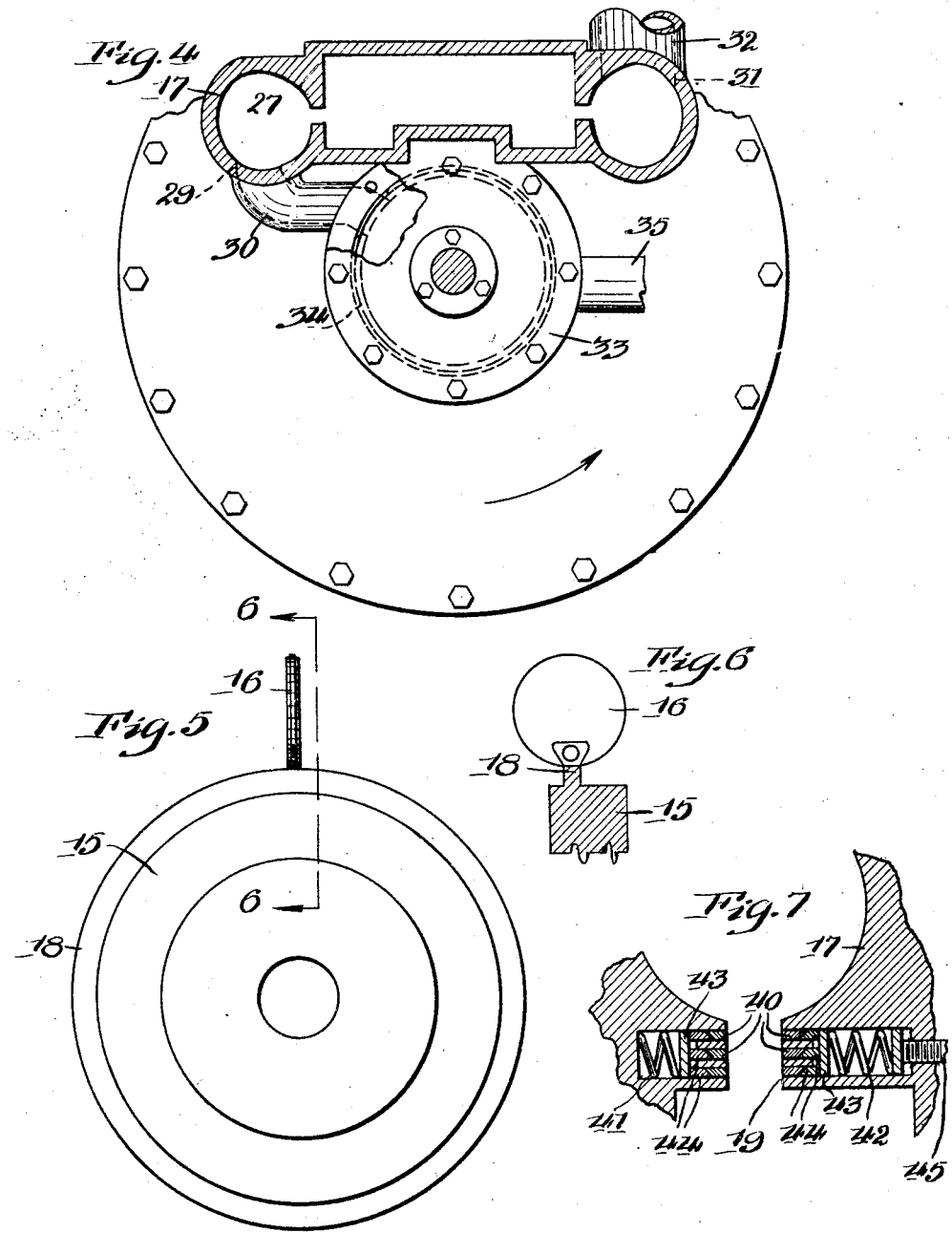

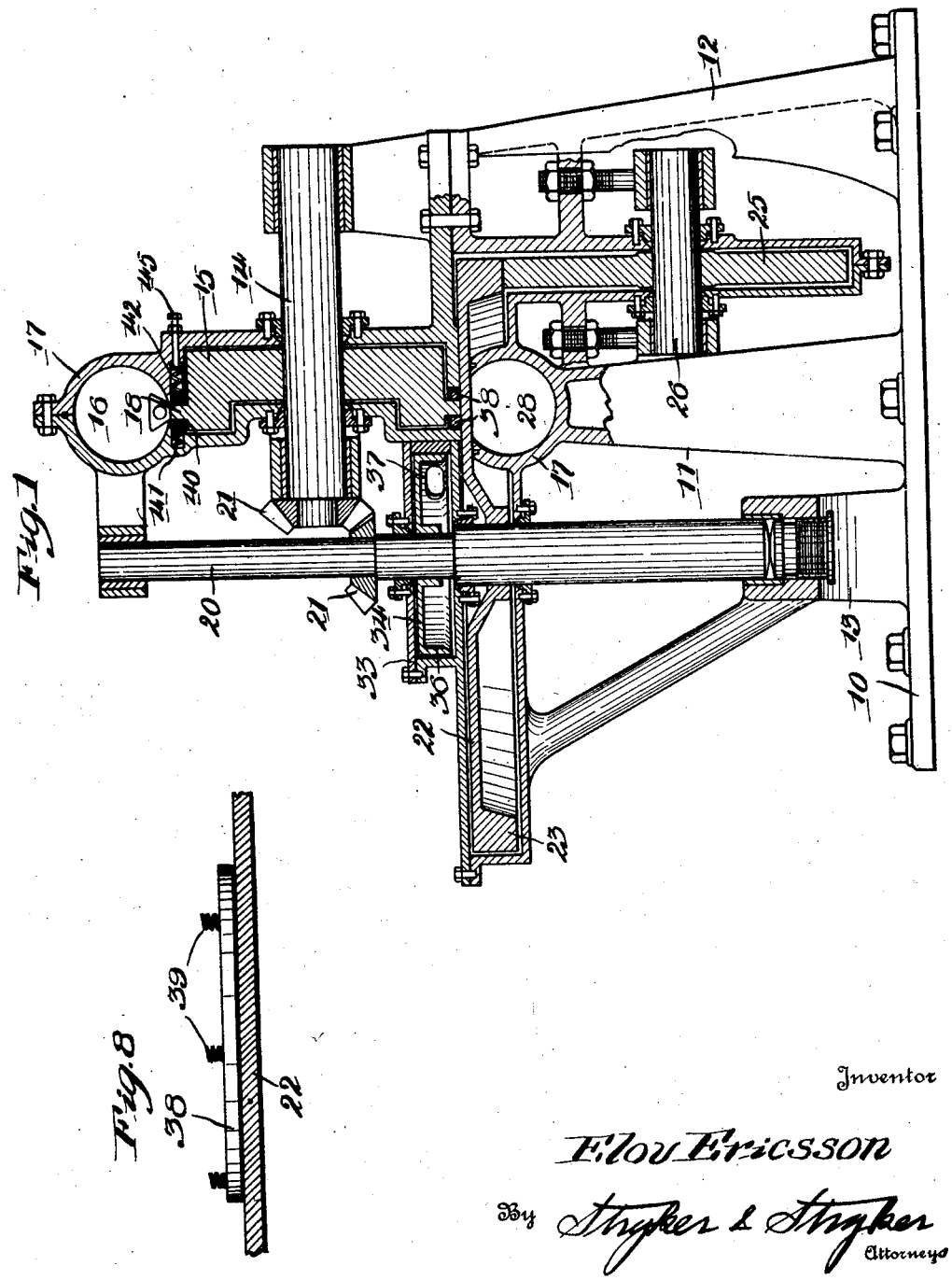

Patented Oct. 30, 1928.

1,689,523

UNITED STATES PATENT OFFICE.

ELOV ERICSSON, OF ST. PAUL, MINNESOTA.

ROTARY ENGINE.

Application filed June 6, 1925. Serial No. 35,350.

It is my object to reduce friction and generally improve the efficiency of an engine of the rotary type by a novel arrangement of an abutment or cut-off disc relative to a piston adapted to rotate in a chamber of toric form.

This invention also includes certain other novel features of construction involving the formation and arrangement of certain packing rings adapted to minimize leakage and friction in an engine of this kind.

In my improved engine, the shafts supporting the piston and cut-off or abutment disc respectively are disposed in the same plane and said disc intersects the torus of the piston chamber approximately upon a tangent to the inner periphery thereof. By this arrangement, I make it possible to provide an unusually rigid cut-off disc having an anti-friction support on its side opposite the one to which the driving pressure for the piston is applied.

In the accompanying drawings, which illustrate the best form of my device at present known to me, Figure 1 is a vertical section taken through the axes of the piston and disc supporting shafts; Fig. 2 is a vertical section in the plane of the axis of the disc shaft, taken at right angles to the section shown in Figure 1; Fig. 3 is a fragmentary, horizontal section taken on the line 3—3 of Fig. 2; Fig. 4 is a section taken on the line 4—4 of Fig. 2; Fig. 5 is a detail, plan view of the rotor with the piston attached thereto; Fig. 6 is a fragmentary sectional view of the piston taken on the line 6—6 of Fig. 5; Fig. 7 is a fragmentary section through the piston chamber showing the arrangement of the rings adapted to minimize leakage at the inner periphery of the cylinder chamber and Fig. 8 is a side elevation of the oval ring for minimizing leakage at the pressure side of the cut-off disc where said disc intersects the piston chamber.

My improved engine is mounted upon a suitable base 10 having a series of standards 11, 12 and 13 adapted to support the bearings and housing for the several moving parts. A horizontal shaft 14 has rigidly mounted thereon a rotor 15, to the periphery of which is attached the piston 16. This piston 16 is arranged to rotate in an annular chamber 17 of toric form. A suitable peripheral flange 18 on the rotor 15 is arranged to extend through an annular slot 19 in the inner periphery of the chamber 17. A vertical shaft 20 is supported in suitable bearings in the engine frame and operatively connected with the shaft 14 by bevel gears 21. This shaft 20 carries a cut-off or abutment disc 22 which intersects the cylinder chamber approximately upon a tangent to the inner periphery thereof, as shown in Figures 1 and 2. The disc 22 is enclosed in a suitable housing and formed at its outer periphery with a flange 23, adapted to render the disc rigid, and affording a bearing for a peripheral support for the disc. Extending through the disc 22 is an opening 24, through which the piston 16 is adapted to pass upon each revolution of the shaft 14 in the operation of the engine, the shafts 14 and 20 being geared one to the other in the speed ratio of one to one. As clearly shown in Figures 1 and 3, the disc 22 extends beyond the chamber 17 and is supported at its outer periphery by an anti-friction wheel or disc 25. This disc 25 is carried by a horizontal shaft 26 supported in suitable bearings in the engine frame.

Thus, the chamber 17 is divided by the disc 22 into a pressure or main segment 27 comprising the greater part of the annular body, and a short segment 28, in which the piston merely idles during the operation of the engine. The segment 27 of the chamber 17 has a pressure end adapted to be supplied by steam through a port 29 and pipe 30, and an exhaust end from which the spent steam is discharged through a port 31 communicating with an exhaust pipe 32. The pipe 30 communicates with a steam chest 33, in which is mounted, a cup-shaped valve 34, fixed on the shaft 20. The steam chest 33 may be supplied by steam under pressure by a suitable pipe, like that indicated by the numeral 35 in Fig. 4. Extending from the periphery of the valve 34 is an annular flange 36 adapted to normally close the port 29, but having an opening 37 disposed to communicate with said port and allow steam to flow from the chest 33 to the chamber 17 at the proper time during the rotation of the piston 16.

Abutting against the disc 22 around the segment 27 of the chamber 17 at the high pressure end thereof is an oval ring 38, which is held in contact with the disc 22 by a series of coiled springs 39 mounted in suitable recesses in the chamber wall (see Figs. 1, 3 and 8). This ring 38 allows the piston 16 to pass freely out of the portion 28 of the chamber 17 and into the portion 27 of the chamber, while maintaining a tight joint between the disc and wall of the chamber 17. To prevent leakage of steam from the chamber 17 through the annular slot 19, I provide the peculiar arrangement of rings shown in detail in Figure 7. Thus, a series of rings 40, mounted on both sides of the flange 18 are arranged to be pressed inward against said flange by springs 41 and 42. These springs 41 and 42 severally press abutment rings 43 upon another series of rings 44 having beveled inner edges which co-act with similar beveled surfaces of the rings 40 to simultaneously urge the rings 40 and 44 against the sides of the guide slots in the chamber walls. Thus, as will be readily understood, pressure of the springs 42 and 41 is so transmitted to the rings 40 and 44 that said rings are not only pressed firmly upon the flange 18 but also are expanded laterally against the guides in the frame and thus prevent leakage by securing a close fit against the frame, as well as against the moving flange 18. Suitable screws 45, Figs. 1 and 7, may be provided to adjust the pressure of the springs 41 and 42. As shown in Figure 3, the oval ring 38 is not continuous, but has ends 46, which abut against opposite sides of the flange 18 on the rotor 15. Similarly, the rings 40, 43 and 44 terminate at opposite sides of the ring 38.

Operation.

In operation, assuming the piston 16 to be in the inert segment 28 of the chamber 17, the flange 18 on the rotor extends through the slot 19, and the connection of the piston with said flange projects through the opening 24 in the disc 22, as shown in Figure 3. Assuming the direction of rotation to be as indicated by arrows in the drawings, the piston is now carried from left to right (Fig. 3) and the disc 22 simultaneously moves therewith, so that the opening 24 permits the piston to pass from the segment 28 into the segment 27. The opening 24 is so formed that the disc 22 will immediately separate the segments 28 and 27 after the piston 16 has passed through said opening. As soon as this cut-off or separation of the segments 27 and 28 occurs, steam is admitted through the port 29 by the operation of the valve 34, which is so arranged that the opening 37 admits steam from the chest 33 through the pipe 30 at this instant. Steam is thus admitted for a portion of the cycle and forces the piston through the chamber 17. When the steam is cut off by the valve 34, it is allowed to expand until the piston uncovers the exhaust port 31, when exhaust takes place. Now the piston again passes into the segment 28 through the opening 24 and the above described cycle is repeated.

An important feature of the present invention is the arrangement by which the cut-off disc 22 is prevented from creating excessive friction under the pressure exerted by the steam. Thus, the wheel 25 forcibly presses upon the side of the disc opposite that to which pressure is applied by the steam, and the peculiar arrangement of the oval ring 38 maintains a tight joint at the pressure side of the disc. It is also to be noted that by my arrangement of the rings 40 and 44 about the rotor flange 18, leakage past said flange during the operation of the piston is practically eliminated.

While I have illustrated and particularly described a rotary engine adapted to utilize steam, it will be evident that by suitable modifications the device is equally well adapted for use as an internal combustion engine.

Having described my invention what I claim as new and desire to protect by Letters Patent is:

1. The combination with a shaft having a rotor fixed thereon, of a piston mounted on said rotor, an annular chamber adapted to receive said piston, a second shaft extending at an angle with said first mentioned shaft in the same plane therewith, a disc fixed concentrically on said second shaft, intersecting said chamber and dividing the same into normally separate segments of unequal length, and means operatively connecting said disc with said rotor, said disc being formed with an opening through which said piston is adapted to pass from one of said segments into another.

2. The combination with a rotor carrying a piston arranged to be moved in a circular path, of an annular chamber adapted to receive said piston, a disc intersecting said chamber and dividing the same into normally separate segments, means operatively connecting said disc with said rotor, said disc being formed with an opening through which said piston is adapted to pass from one of said segments into another during the rotation thereof, means for admitting fluid under pressure to one end of a segment, an oval ring encircling said segment adjacent to a face of said disc and means for resiliently pressing said ring upon said disc.

3. The combination with an annular rotor having a piston mounted on the periphery thereof, of an annular chamber adapted to receive said piston, a disc intersecting said chamber and dividing the same into a power segment and an inert segment, means operatively connecting said disc with said rotor, said disc being formed with an opening through which said piston is adapted to pass from one of said segments into another during the rotation thereof, means for admitting fluid under pressure to one end of said power segment, a ring encircling said power segment near said end and adjacent to the face of said disc and means for resiliently pressing said ring upon said disc.

4. The combination with an annular rotor having a piston fixed thereon, of an annular chamber adapted to receive said piston, said chamber being formed with an annular slot in its wall, a flange on said rotor extending into said slot, a disc intersecting said chamber substantially upon a tangent to its periphery and dividing said chamber into two segments, said disc being arranged to abut against the periphery of said flange and means for operatively connecting said rotor and disc whereby the periphery of said flange will be moved in substantially the same direction with said disc at its point of contact with said flange.

5. The combination with an annular rotor having a piston fixed on the periphery thereof, of an annular chamber adapted to receive said piston, said chamber being formed with an annular slot in its inner periphery, a flange on said rotor closing said slot, a disc intersecting said chamber substantially upon a tangent to the inner periphery thereof and dividing said chamber into two segments, said disc being arranged to make rolling contact with the periphery of said flange and means for operatively connecting said rotor and disc whereby the periphery of said flange will be moved in substantially the same direction with said disc at its point of contact with said flange.

6. The combination with a pair of shafts extending in the same plane at an angle one to the other, of a rotor mounted on one of said shafts, a piston on said rotor adapted to be moved in a circular path, an annular chamber adapted to receive said piston, a disc fixed on the other of said shafts, disposed to intersect said chamber and dividing the same into a power segment and an inert segment, said disc being formed with an opening through which said piston is adapted to pass from one of said segments into another during the rotation of the disc, and a valve for controlling the admission of fluid to said power segment mounted adjacent to said disc on said last mentioned shaft.

In testimony whereof, I have hereunto signed my name to this specification.

ELOV ERICSSON.